(12) United States Patent
Yao

(10) Patent No.: US 12,493,423 B2
(45) Date of Patent: Dec. 9, 2025

(54) LOGICAL VOLUME CONSTRUCTION METHOD AND APPARATUS, AND DEVICE, READABLE STORAGE MEDIUM AND PROGRAM PRODUCT

(71) Applicant: HANGZHOU ALICLOUD FEITIAN INFORMATION TECHNOLOGY CO., LTD., Hangzhou (CN)

(72) Inventor: Zhenxi Yao, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,175

(22) PCT Filed: Oct. 8, 2022

(86) PCT No.: PCT/CN2022/123899
§ 371 (c)(1),
(2) Date: Feb. 20, 2024

(87) PCT Pub. No.: WO2023/061266
PCT Pub. Date: Apr. 20, 2023

(65) Prior Publication Data
US 2025/0138736 A1     May 1, 2025

(30) Foreign Application Priority Data
Oct. 15, 2021 (CN) .......................... 202111205600.8

(51) Int. Cl.
*G06F 3/06* (2006.01)
(52) U.S. Cl.
CPC .......... *G06F 3/0631* (2013.01); *G06F 3/0604* (2013.01); *G06F 3/0673* (2013.01)

(58) Field of Classification Search
None
See application file for complete search history.

(56) References Cited

U.S. PATENT DOCUMENTS

2008/0263306 A1* 10/2008 Tanizawa .............. G06F 3/0608
                                                      711/170
2013/0124797 A1* 5/2013 Hamblin ............... G06F 3/0665
                                                 711/E12.001

(Continued)

FOREIGN PATENT DOCUMENTS

CN     101986655 A     3/2011
CN     105224247 A     1/2016

(Continued)

OTHER PUBLICATIONS

China Second Office Action, Application No. 202111205600.8, dated Jan. 24, 2025, 15 pps.: with English translation.

(Continued)

*Primary Examiner* — Ryan Bertram
*Assistant Examiner* — Edmund H Kwong
(74) *Attorney, Agent, or Firm* — Armstrong Teasdale LLP

(57) ABSTRACT

Embodiments of the present disclosure relate to a logical volume construction method and apparatus, and a device, a readable storage medium and a program product. The method comprises: acquiring logical volume construction demand information; constructing a logical volume based on the logical volume construction demand information, and obtaining logical volume information, wherein the logical volume comprises one or more logical units from different physical storage devices; and establishing, based on the logical volume information, a connection between one or more hosts and the logical volume, wherein the hosts have a mapping relationship with the logical volume, and differ in read/write permission for the logical volume.

19 Claims, 3 Drawing Sheets

(56) References Cited

U.S. PATENT DOCUMENTS

| | | | |
|---|---|---|---|
| 2016/0139845 A1* | 5/2016 | Muhlestein | G06F 3/0673 |
| | | | 711/163 |
| 2017/0131920 A1* | 5/2017 | Oshins | G06F 3/0664 |
| 2020/0028678 A1* | 1/2020 | Gao | G06F 21/602 |

FOREIGN PATENT DOCUMENTS

| | | |
|---|---|---|
| CN | 105471695 A | 4/2016 |
| CN | 109144581 A | 1/2019 |
| CN | 114115722 A | 3/2022 |
| JP | 201215583 A | 8/2012 |

OTHER PUBLICATIONS

Office Action (First Office Action) dated Jun. 21, 2024 for CN App. No. 202111205600.8 (pp. 1-7).
International Search Report for PCT/CN2022/123899, mailed Nov. 28, 2022, 3 pages.

* cited by examiner

LOGICAL VOLUME CONSTRUCTION METHOD AND APPARATUS, AND DEVICE, READABLE STORAGE MEDIUM AND PROGRAM PRODUCT

This application is the 35 U.S.C. § 371 U.S. National Phase of International Patent Application No. PCT/CN2022/123899, filed Oct. 8, 2022, which claims priority to Chinese patent application No. 202111205600.8 entitled "Logical Volume Construction Method and Apparatus, and Device, Readable Storage Medium and Program Product" filed on Oct. 15, 2021, the disclosures of which are incorporated herein by reference in their entirety.

TECHNICAL FIELD

Embodiments of the present disclosure generally relate to a field of data storage technologies, and specifically to a logical volume construction method and apparatus, and a device, a readable storage medium and a program product.

BACKGROUND

With the development of data technology, shared storage has a much broader application. Shared storage refers to a type of storage products installed on a plurality of hosts or computing nodes and configured to allow the hosts or computing nodes to simultaneously access data thereon. For example, SAN (Storage Area Network) storage and distributed storage are currently common shared storage products that can support write once read many, but the SAN storage and the distributed storage are limited, to different extent, in terms of capacity, read/write switch and the like. According to the related technologies, there are provided solutions including an LVM (Logical Volume Manager) and a CLVM (Cluster Logical Volume Manager). However, as a stand-alone version, LVM cannot implement read/write control of an LV (Logical Volume) between multiple hosts; though the CLVM is a cluster version, it requires an application such as a file system, and the like, to implement read/write control as lacking read/write control therein. That is, the solutions according to the related technologies can only partly provide the LV capability, but cannot meet the write once read many requirements at the global level.

SUMMARY

Embodiments of the present disclosure relate to a logical volume construction method and apparatus, and a device, a readable storage medium and a program product.

In a first aspect, the embodiments of the present disclosure provide a logical volume construction method.

In an implementation, the logical volume construction method includes: acquiring logical volume construction demand information; constructing a logical volume based on the logical volume construction demand information and obtaining logical volume information, wherein the logical volume includes one or more logical units from different physical storage devices; and establishing, based on the logical volume information, a connection between one or more hosts and the logical volume, wherein the hosts have a mapping relationship with the logical volume, and differ in read/write permission for the logical volume.

In a second aspect, the embodiments of the present disclosure provide a logical volume construction apparatus.

In an implementation, the logical volume construction apparatus includes: an acquisition module configured to acquire logical volume construction demand information; a construction module configured to construct a logical volume based on the logical volume construction demand information and obtain logical volume information, wherein the logical volume includes one or more logical units from different physical storage devices; and an establishment module configured to establish a connection between one or more hosts and the logical volume based on the logical volume information, wherein the hosts have a mapping relationship with the logical volume and differ in read/write permission for the logical volume.

In a third aspect, the embodiments of the present disclosure provide an electronic device, including a memory for storing one or more computer instructions to support a logical volume construction apparatus to perform the logical volume construction method as described above, and a processor configured to execute computer instructions stored in the memory. The logical volume construction apparatus may further include a communication interface for use in connection between the logical volume construction apparatus and other device or a communication network.

In a fourth aspect, the embodiments of the present disclosure provide a computer readable storage medium for storing computer instructions used by a logical volume construction apparatus, which contains computer instructions for the logical volume construction apparatus to perform the logical volume construction method as described above.

In a fifth aspect, the embodiments of the present disclosure provide a computer program product including computer programs/instructions, wherein the computer programs/instructions are executed by a processor to implement steps of the logical volume construction method as described above.

It would be appreciated that the above general description and the following detailed description are provided only exemplarily and illustratively, not limiting the embodiments of the present disclosure. This Summary is provided for the illustrative purpose, without an intention to suggest any limitation. In addition to the exemplary aspects, implementations and features as described above, further aspects, implementations and features of the present disclosure will become apparent with reference to the drawings and the following detailed description.

BRIEF DESCRIPTION OF THE DRAWINGS

Other objectives, features, and advantages of the present disclosure will become more apparent through the following detailed description of the non-limited embodiments with reference to the accompanying drawings. In the drawings.

DETAILED DESCRIPTION OF EMBODIMENTS

Reference now will be made to the drawings to describe in detail the example implementations of embodiments of the present disclosure, to enable those skilled in the art to easily carry them out. In addition, for clarity, components not related to the description of the example implementations are omitted from the drawings.

In the embodiments of the present disclosure, as would be appreciated, the term such as "include," "comprise," or the like are to indicate presence of feature(s), number(s), step(s), act(s), component(s), or part(s), as disclosed here, or a combination thereof, without excluding a possibility of presence or addition of one or more other features, numbers, steps, acts, components, parts, or a combination thereof.

Moreover, it is worth noting that features in an embodiment or across embodiments of the present disclosure could be combined without any conflict. Hereinafter, embodiments of the present disclosure will be described in detail with reference to the drawings.

The technical solution provided by embodiments of the present disclosure includes constructing logical units from different or heterogeneous physical storage devices into a new logical volume, and mapping the logical volume to all hosts required to perform data storage access (i.e., establishing a connection with one or more hosts), such that subsequent access to physical storage devices by applications can be performed based on a new logical volume. In absence of cooperation of an application layer such as a file system and the like, the technical solution can achieve management and read/write control of a logical volume among a plurality of hosts by means of settings of different hosts on the read/write permission for a logical volume, and thus meet the read/write control requirement of write once read many at the global level while reducing the complexity of implementing logical volume management, and a global read/write control solution in storage is provided for an application in the form of write once read many.

Figure 1:
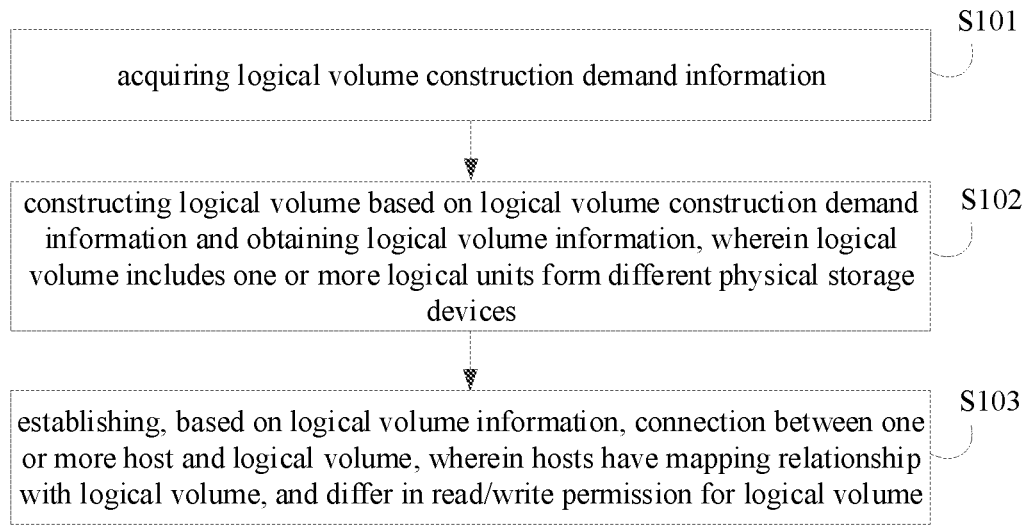
FIG. 1 illustrates a flowchart of a logical volume construction method according to an implementation of the present disclosure.

FIG. 1 illustrates a flowchart of a logical volume construction method according to an implementation of the present disclosure. As shown therein, the logical volume construction method includes steps S101 through S103, specifically:

In step S101, acquiring logical volume construction demand information;

In step S102, constructing a logical volume based on the logical volume construction demand information, and obtaining logical volume information, where the logical volume includes one or more logical units form different physical storage devices; and In step S103, establishing, based on the logical volume information, a connection between one or more host and a logical volume, where the hosts have a mapping relationship with the logical volume, and differ in read/write permission for the logical volume.

As aforementioned, with the development of data technology, shared storage has a much broader application. Shared storage refers to a type of storage products installed on a plurality of hosts or computing nodes and configured to allow the hosts or computing nodes to simultaneously access data thereon. For example, SAN (Storage Area Network) storage and distributed storage are currently common shared storage products that can support write once read many, but the SAN storage and the distributed storage are limited, to different extent, in terms of capacity, read/write switch and the like. According to the related technologies, there are provided solutions including an LVM (Logical Volume Manager) and a CLVM (Cluster Logical Volume Manager). However, as a stand-alone version, LVM cannot implement read/write control of an LV (Logical Volume) between multiple hosts; though the CLVM is a cluster version, it requires an application such as a file system, and the like, to implement read/write control as lacking read/write control therein. That is, the solutions according to the related technologies can only partly provide the LV capability, but cannot meet the write on-read many requirements at the global level.

Considering the above problem, in the implementation, there is provided a logical volume construction method. The method includes constructing logical units from different or heterogeneous physical storage devices into a new logical volume, and mapping the logical volume to all hosts required to perform data storage access (i.e., establishing a connection with one or more hosts), such that subsequent access to physical storage devices by applications can be performed based on a new logical volume. In absence of cooperation of an application layer such as a file system and the like, the technical solution can achieve management and read/write control of a logical volume between a plurality of hosts by means of settings of different hosts on the read/write permission for a logical volume, to thus meet the read/write control requirement of write once read many at the global level while reducing the complexity of implementing logical volume management, and a global read/write control solution in storage is provided for an application in the form of write once read many.

In an implementation of the present disclosure, the logical volume construction method can be applied to computers, electronic devices, servers, service clusters, and the like, which can perform logical volume construction processing.

In an implementation of the present disclosure, a logical volume refers to a virtual disk formed by a logical disk. In an embodiment, the logical volume may include one or more logical units from different or heterogeneous physical storage devices. Wherein, the physical storage device may be a system-level physical storage device such as a computer, or may be a component-level physical storage device such as a memory chip; the physical storage device may be a device supporting an SAN storage structure, or may be a device supporting a distributed storage structure.

In an implementation of the present disclosure, the logical volume construction demand information refers to information required by a user or a logical volume constructer for logical volume construction. The logical volume construction demand information may include one or more of the following: a logical volume name, logical volume level demand information, logical unit information composing the logical volume, a logical unit combining manner, and other logical volume construction demand information.

The logical volume level demand information refers to demand information on a level of a logical volume to be constructed. As described above, the logical volume may include one or more logical units from different physical storage devices, and since different physical storage devices may be varied in geological location, performance bandwidth, and device reliability, the logical volumes consisting of one or more logical units from different physical storage device may also be different in applicability. Therefore, in an implementation of the present disclosure, level setting may be performed for the logical volumes, to identify logical volumes with different performances while providing options for logical volume construction. In some implementations, the logical volumes can be divided into four levels, specifically: Level 1, where all logical units of a logical volume are all from the same physical storage device (i.e., the source storage devices of all the logical units of the logical volume are the same, and physical storage devices are identical in identifiable identification information such as manufacturer, model, sequence number and the like, and storage type), where the storage type refers to SAN storage or distributed storage, and since the logical units forming the logical volume at this level are from the same physical storage device, the logical volume at this level has the highest reliability; Level 2, where logical units of a logical volume are not necessarily from the same physical storage device, but the source physical storage devices are identical in manufacturer, model, and storage type; Level 3, where physical storage devices, sources of logical units of a logical volume, are identical in manufacturer and storage type; and Level 4, where physical storage devices, sources of logical units of a logical volume, are not particularly limited.

Logical unit information composing the logical volume refers to distinguishable information on requirements for logical units composing the logical volume, for example, distinguishable identification information of logical units such as WWID (World Wide Identification Number), and the like. Based on the logical unit information composing the logical volume, logical units forming the logical volume can be determined, and the logical volume then can be constructed.

Figure 2A:
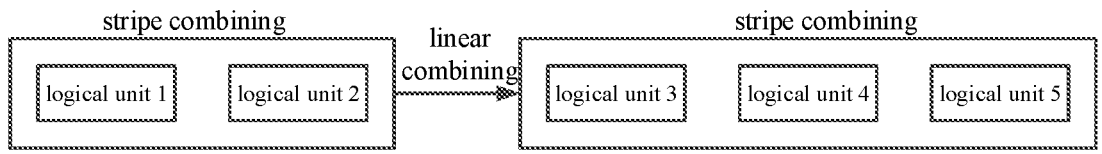
FIG. 2A illustrates a schematic diagram of a logical unit combination according to an implementation of the present disclosure.
Figure 2B:
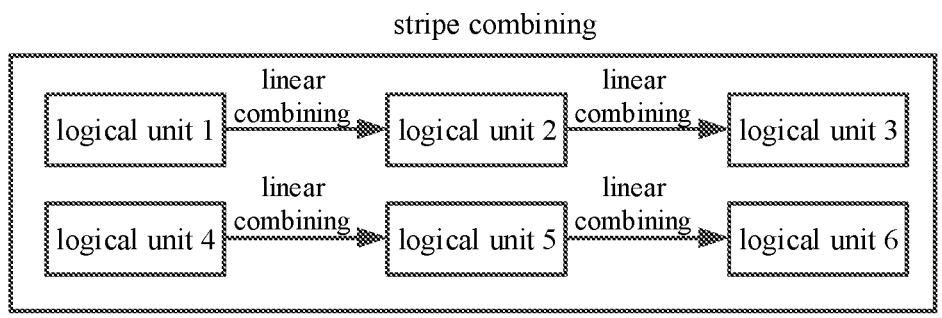
FIG. 2B illustrates a schematic diagram of a logical unit combination according to a further implementation of the present disclosure.

The logical unit combining manner refer to a manner of combining logical units to generate a logical volume, for example, a stripe manner, a linear manner, and a linear+stripe manner based on the Linux device mapper. The stripe manner refers to combining logical units in a stripe manner to obtain a logical volume; a linear manner refers to combining logical units in a linear manner to obtain a logical volume; and a linear+stripe manner refers to combining logical units in a linear and a stripe manner, which cannot only efficiently improve the system IO throughput but can also support the subsequent storage capacity expanding operation. FIG. 2A illustrates a logical unit combining manner according to an implementation of the present disclosure. As shown therein, in the implementation, there are 5 logical units, namely logical units 1 through 5, where the logical units 1 and 2 are combined in a stripe manner, the logical units 3, 4 and 5 are also combined in a stripe manner, and the two stripe combinations are combined in a stripe manner to obtain a final logical volume. FIG. 2B illustrates a schematic diagram of a logical unit combination according to a further implementation of the present disclosure. As shown therein, in the implementation, there are 6 logical units, namely logical units 1 through 6, where logical units 1, 2 and 3 are combined in a linear manner, the logical units 4, 5 and 6 are also combined in a linear manner, and the two linear combinations are then combined in a stripe manner, to obtain a final logical volume. In this way, the stripe and linear manners based on the Linux device mapper can enable logical units from different physical storage devices to be remapped into a new logical volume such that subsequent access to physical storage devices by applications can be performed based on the new logical volume.

In an implementation of the present disclosure, logical volume information refers to information related to the logical volume obtained after logical volume construction is completed. Logical volume information may include one or more of the following: a logical volume name, logical volume level information, a logical volume size, logical unit information composing the logical volume, and a logical unit combining manner, and other information related to the logical volume. Explanations and description of the logical volume name, the logical volume level information, the logical unit information composing the logical volume, and the logical unit combining manner are similar to those provided for the logical construction demand information, and the only difference lies in that the logical volume information is information related to the logical volume constructed based on the logical volume construction demand information.

In the above implementation, after acquiring the logical volume construction demand information, a logical volume including one or more logical units from different physical storage devices can be constructed based on the logical volume construction demand information, and logical volume information after construction is completed can be obtained; then, a connection between one or more hosts and the logical volume can be established based on the logical volume information (i.e., the logical volume is mapped into one or more hosts), to allow future data access to the logical volume via the hosts, where the hosts and the logical volume have a mapping relationship such that the one or more hosts can access the logical volume. It is to be emphasized that the one or more hosts have different the read/write permission for the logical volume, i.e., the logical volume provides different read/write roles for the different hosts. For example, in an implementation of the present disclosure, in one or more hosts, only one host has the read/write permission while other hosts only have a read-only permission.

In an implementation of the present disclosure, step S101, namely acquiring logical volume construction demand information, may include a step of: acquiring the logical volume construction demand information from an interaction interface of a terminal.

In the implementation, the logical volume construction demand information can be input by a user or other logical volume constructer via an interaction interface of a respective terminal, according to the actual application need.

In an implementation of the present disclose, step S102, namely constructing a logical volume based on the logical volume construction demand information, may include steps of: determining target logical units based on the logical volume level demand information and the logical unit information composing the logical volume in the logical volume construction demand information; combining the target logical units based on the logical unit combining manner, to obtain the logical volume; and naming the logical volume based on the logical volume name.

In the implementation, after acquiring the logical construction demand information, a logical volume meeting the logical volume construction demand can be constructed based on the logical volume construction demand information. In an embodiment, target logical units composing the logical volume are determined based on the logical volume level demand information and logical unit information composing the logical volume in the logical volume construction demand information; then, the target logical units are combined based on the logical unit combining manner in the logical volume construction demand information, to thus obtain the logical volume; and finally, the logical volume is named based on the logical volume name in the logical volume construction demand information, to thus complete the logical volume construction.

In an implementation of the present disclosure, step S103, namely establishing a connection between the one or more hosts and the logical volume based on the logical volume information, may include steps of: sending, by a logical volume management component, the logical volume information to logical volume proxy components, where the logical volume proxy components are deployed over different hosts; and establishing, by the logical volume proxy components, a connection between the hosts and the logical volume based on the logical volume information.

In the implementation, the connection between the hosts and the logical volume is established by means of the logical volume management component and the logical volume proxy components deployed over different hosts. For example, firstly, the logical volume management component sends the logical volume information to a logical volume proxy component deployed on each host, where: the logical volume management component refers to a component that can implement overall scheduling of all logical volume proxy components, to thus achieve global management of the logical volume, which may be installed on one or more hosts using the logical volume, or may be installed on a host connected to a network comprised of the one or more hosts; and the logical volume proxy component refers to a component that can be in communication with the logical volume management component, execute instructions issued by the logical volume management component, and provide information related to feedback to the logical volume management component, which is installed on any host related to or connected with the logical volume and required to perform data storage access. Then, the logical volume proxy components establish a connection between the respective hosts and the logical volume based on the received logical volume information.

In an implementation of the present disclosure, establishing, by the logical volume proxy components, a connection between the hosts and the logical volume may include steps of: performing a level check, by an executed logical volume proxy component, based on the logical volume information; upon determining the level check passes, storing the logical volume information, by the executed logical volume proxy component, the logical unit information included in the logical volume, and the logical unit mapping data into preset sectors of respective logical units of the logical volume; reading the logical volume information, the logical unit information included in the logical volume, and logical unit mapping data from the predetermined sectors of the logical units, and performing a security check based on the logical unit information, by a non-executed the logical volume proxy component; upon determining the security check passes, establishing, by the logical volume proxy component, the connection between the hosts and the logical volume based on the logical unit mapping data.

The executed logical volume proxy component refers to a logical volume proxy component for guiding establishment of a connection between hosts and the logical volume in the plurality of logical volume proxy components. The executed logical volume proxy component can be predetermined, which may be, for example, predetermined logical volume proxy components deployed on a first host in the one or more hosts.

In the implementation, the executed logical volume proxy component guides establishment of the connection between the hosts and the logical volume.

In an embodiment, the executed logical volume proxy component first performs the level check based on the logical volume information, where: the level check refers to level check performed based on the logical volume level information included in the logical volume information, i.e., the logical volume level information included in the logical volume information is compared to the logical volume level demand information in the logical volume construction demand information; if the two are consistent, it is considered that the level check passes; otherwise, it is considered that the level check fails. For convenience in performing the level check, the logical construction demand information may be stored in advance on the executed logical volume proxy component or the host where the executed logical volume proxy component is located.

Figure 3:
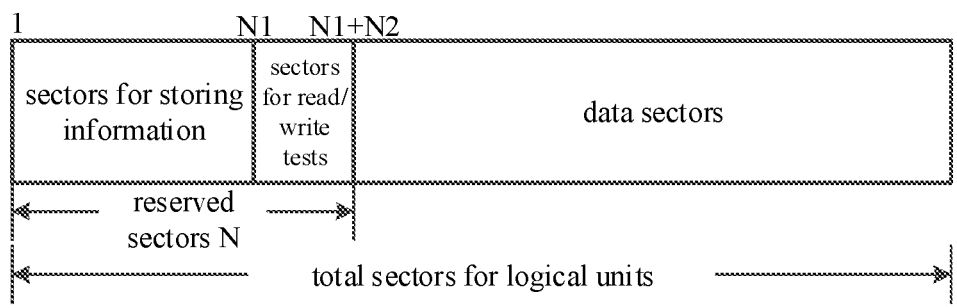
FIG. 3 illustrates a schematic diagram of sector allocation of a certain logical unit according to an implementation of the present disclosure.

If it is determined that the level check passes, in order to ensure consistency of metadata, the executed logical volume proxy component stores the logical volume information, the logical unit information included in the logical volume, and the logical unit mapping data into preset sectors of respective logical units of the logical volume, where logical unit information included in the logical volume may include one or more of the following: a total number of logical volume logical units, logical volume logical unit distinguishable identification information, a logical volume logical unit distinguishable identification information sequence, a sequence number of a certain logical unit in the logical volume, a security check code of a certain logical unit, a total sector number of a certain logical unit, a number of reserved sectors of a certain logical unit, a starting number of reserved sectors of a certain logical unit, a number of read/write test sectors of a certain logical unit, a start number of read-write test sectors of a logical unit, logical unit information of a next logical unit, and the like. Since a certain logical unit stores not only metadata of itself but also logical unit information of a next logical unit, redundant storage of logical unit information of the next logical unit can effectively guarantee metadata recovery upon data loss or a failure occurring in the next logical unit, to implement the metadata disaster recovery capability. Wherein, the security check code of the logical unit refers to a check code used to determine data security or an untampered state of the logical unit, which may be, for example, an MD5 code generated by the system, and the like; the logical unit mapping data refers to mapping data from a logical device, such as a logical unit and the like, to a physical device, such as host and the like, for example, dm-table (linux Device mapper mapping rule set). Wherein, the preset sectors refer to sectors for storing the above-mentioned information reserved in each logical unit to ensure consistency of metadata. The number of the preset sectors and positions thereof may be arranged according to the actual application need. For example, the number of preset sectors may be set to be >=4096. The number of the preset sectors and positions thereof are not particularly limited here. Sector distribution of a certain logical unit according to an implementation of the present disclosure is illustrated in FIG. 3. In the implementation, the first N sectors (N>=4096) of the logical unit are configured as reserved sectors, where first N1 sectors in the reserved sectors are used to store the above-mentioned information, the following N sectors are used for read/write tests, and the remaining sectors of the logical unit are configured as data sectors.

Thereafter, the non-executed logical volume proxy component reads the logical volume information, the logical unit information included in the logical volume, and the logical unit mapping data from the preset sectors of the logical units, and perform data security check based on the logical unit security check code in the logical unit information, to ensure that the data are not tampered. Wherein, the non-executed logical volume proxy component refers to other logical volume proxy component than the executed logical volume proxy component, i.e., in the plurality of logical volume proxy components, only one logical volume proxy component performs a metadata write operation, and other logical volume proxy components only perform metadata read and data security check operations.

Finally, after determining that the security check passes, the respective logical volume proxy components can acquire the logical unit mapping data, and establish a connection between the hosts and the logical volume based on the logical unit mapping data, i.e., the logical unit mapping data become effective on the respective hosts. In this way, it can be ensured that the logical volume proxy components can obtain the same logical unit mapping data, to thus guarantee the consistency of each host logical volume information. Although the logical volume is independent to each host, since each host logical volume information is consistent, only a name of the same logical volume is required for association in use to enable free migration of data between different hosts, from the global perspective of the host cluster, which means that access to the stored data is free from usage of the same logical volume.

In an implementation of the present disclosure, after determining that the security check passes, the step of establishing, by the logical volume proxy components, the connection between the hosts and the logical volume based on the logical unit mapping data may include steps of: upon determining that the security check passes, sending, by the logical volume proxy components, a logical unit mapping data reading result to the logical volume management component; in a case that all the logical volume proxy components successfully read the logical unit mapping data, determining that mapping data reading succeeds, sending, by the logical volume management component, a mapping data reading success message to the logical volume proxy components, and establishing, by the logical volume proxy components, the connection between the hosts and the logical volume based on the logical unit mapping data; and in a case that one of the logical volume proxy components fails to read the logical unit mapping data, determining that mapping data reading fails, and sending, by the logical volume management component, a mapping data reading failure message to the logical volume proxy components, and deleting, by the logical volume proxy components, the logical unit mapping data obtained by reading.

In the implementation, after determining the security check passes, the logical volume proxy components implement establishment of the connection between the hosts and the logical volume. In an embodiment, after determining the security check passes, the logical volume proxy components send to the logical volume management component a logical unit mapping data reading result, for example, a logical unit mapping data reading success or failure result. If reading the logical unit mapping data fails, it is further required to send a cause of the logical unit mapping data reading failure to the logical volume management component, where the cause of the logical unit mapping data reading failure may be, for example, that the data are tampered, the security check does not pass, or the like. Then, the logical volume management component aggregates the logical unit mapping data reading results sent by the logical unit proxy components, and determines that the mapping data reading succeeds only in a case that all the logical volume proxy components successfully read the logical unit mapping data, i.e., the logical volume host mapping succeeds. Thereafter, the logical volume management component sends the mapping data reading success message to the logical volume proxy components, and the logical volume proxy components then establish a connection between the hosts and the logical volume based on the logical unit mapping data. If reading logical unit mapping data of a logical volume proxy component fails, it is determined that reading the mapping data fails (i.e., the logical volume host mapping fails), and the logical volume management component then sends a mapping data reading failure message to the logical volume proxy components. At this time, the logical volume proxy components having read the logical unit mapping data need to delete the logical unit mapping data obtained by reading, and may simultaneously delete data written into the logical units in this mapping connection operation and wait for a next mapping connection operation; and the logical volume proxy components having not read the logical unit mapping data need not perform any action.

In an implementation of the present disclosure, the method may further include a step of: acquiring and storing logical unit metadata and sending the logical unit metadata to the logical volume management component for storage, by the logical volume proxy components.

In order to provide data support to the logical volume construction operation and the logical volume connection operation, it is also required to acquire in time the logical unit metadata and store the same. In an embodiment, in order to guarantee the safety of the logical unit metadata while avoiding logical unit metadata loss, after acquiring the logical unit metadata, the logical volume proxy components not only send in real time the logical unit metadata to the logical volume management component such that the logical volume management component can collectively store the logical unit metadata, but also store the logical unit metadata locally, to facilitate real-time comparisons of the logical unit metadata. Wherein, the logical volume proxy components can collect and acquire periodically or in real time the logical unit metadata, logical unit configuration change information such as a capacity change, and the like, mapped to the hosts; the logical unit metadata may include one or more of the following data: a logical unit ID, a logical unit WWID, a manufacturer of a physical storage device where the logical unit is located, a mode of the physical storage device, a serial number of the physical storage device, HBA (Host Bus Adapter) information of the physical storage device, a size of the logical unit, a number of sectors of the logical unit, whether the logical unit is formatted, a file system with a formatted logical unit, and the like.

In an implementation of the present disclosure, after the logical volume mapping operation is completed, it is required to configure the read/write permission of hosts based on an application, i.e., the method further include a step of: controlling the read/write permission of one or more hosts based on a read/write designation instruction.

In an implementation of the present disclosure, the step of controlling the read/write permission of one or more hosts based on the read/write designation instruction may include steps of: in response to the received read/write designation instruction, sending, by the logical volume management component, a read/write lock scrambling instruction to a target logical volume proxy component of a target host corresponding to the read/write designation instruction; in response to receiving the read/write lock scrambling instruction, performing, by the target logical volume proxy component, a read/write lock scrambling operation; in response to that the read/write lock scrambling operation succeeds, performing, by the target logical volume proxy component, a data read/write test for the logical units of the logical volume; sending, by the target logical volume proxy component, a read/write lock scrambling result and a data read/write test result to the logical volume management component; in a case that both the read/write lock scrambling result and the data read/write test result are success, sending, by the logical volume management component, a data read/write test command to other logical volume proxy components, to determine that the other logical volume proxy component succeeds in data reading but fails in data writing; in a case that the read/write lock scrambling result is failure, sending, by the logical volume management component, a read/write scrambling instruction to a historical read/write logical volume proxy component, to enable the historical read/write logical volume proxy component to regain read/write permission; in a case that a read/write lock scrambling result of the target logical volume proxy component and a read/write regaining result of the historical read/write logical volume proxy component are both failure, marking, by the logical volume management component, the logical volume as failed.

In the implementation, read/write control SCI protocol SCSI-3-based PRs (Persistent Reservations)-No. 7 locks set logical volume logical unit read/write permission by means of different hosts to implement read/write control of a logical volume between a plurality of hosts, to thus meet the read/write control requirement of write once read many while reducing the complexity of implementing logical volume management. Wherein, logical units of the logical volume and physical storage devices thereof should all support the SCSI-3 protocol and the PRs-No. 7 lock type, and register in advance PRs lock type on the hosts corresponding to all the logical units of the logical volume as PRs-No. 7 lock. In the PRs-No. 7 lock, all the registrants can perform a write operation while all registered I_T connections (Initiator-Target connections) are holders. In a case where the system sets that only one host has the read/write permission, if a host having a read-only permission grains the read/write permission, the original host with the read/write permission will automatically downgraded to having the read-only permission, to thus guarantee that there is always only one host having the read/write permission in the entire storage structure.

In an embodiment, in response to receiving the read/write designation instruction, the logical volume management component sends a read/write lock scrambling instruction to a target logical volume proxy component of a target host corresponding to the read/write designation instruction, where the read/write designation instruction refers to an instruction for designating a host with the read/write permission, sent by an application or other instruction sender, i.e., a target host corresponding to the read/write designation instruction is a host designated with the read/write permission, where the read/write designation instruction can be received via an external service interface provided by the logical volume management component; the read/write lock scrambling instruction refers to an instruction for triggering a target logical volume proxy component of a target host corresponding to the read/write designation instruction to perform a read/write lock scrambling operation. In an implementation of the present disclosure, assumed that there are currently 3 hosts including: Host1, Host2 and Host3, the read/write designation instruction indicates that the host Host2 is in a read/write state, and the remaining are in a read-only state, i.e., the host Host 2 has the read/write permission while the hosts Host1 and Host 2 have a read-only permission.

In response to receiving the read/write lock scrambling instruction, the target logical volume proxy component performs a read/write lock scrambling operation, i.e., the PRs lock types of the target hosts corresponding to all the logical units of the logical volume are registered as PRs-No. 7 locks. By way of example, a hostkey of a target host is first registered respectively on all the logical units of the logical volume, and a PRs-No. 7 lock is then applied to the hostkey of the target host. Since the logical volume includes a plurality of logical units, only if the read/write lock scrambling operation on all the logical units succeeds, it can be determined that the read/write lock scrambling operation of the target host succeeds; otherwise, it is regarded that the read/write lock scrambling operation of the target host fails.

In response to that the read/write lock scrambling operation succeeds, the target logical volume proxy component performs a data read/write test for logical units of the logical volume (i.e., performing a data write operation for read/write test sectors on the logical units of the logical volume), to determine whether the read/write state of the target host is normal. In a normal condition, at this time, the target logical volume proxy component, or the target host, can write the data to the read/write test sectors on the logical units of the logical volume; if the read/write lock scrambling operation fails, the target logical volume proxy component does not perform any action. In this way, the accuracy and reliability of the read/write lock scrambling operation can be guaranteed by means of dual operations of the PRs-No. 7 lock and the data read/write test.

Then, the target logical volume proxy component sends a read/write lock scrambling result and a data read/write test result to the logical volume management component.

In a case that the read/write lock scrambling result and the data read/write test result are both success, the logical volume management component sends a data read/write test command to other logical volume proxy components, to trigger other logical volume proxy components to perform a data write operation for read/write test sectors on the logical units of the logical volume, to thus determine whether other logical volume proxy components are in a read-only state where data reading succeeds but data writing fails.

If the read/write lock scrambling result is failure, the logical management volume sends a data read/write test command to a historical read/write logical volume proxy component, to enable the history read/write logical volume proxy component to perform a read/write lock scrambling operation to regain the read/write permission (i.e., to cause the read/write permission to be returned to a previous host with the read/write permission), where the historical read/write logical volume proxy component refer to a logical volume proxy component with the read/write permission on a host before the target host is designated to be the host with the read/write permission. The read/write lock scrambling operation of the historical read/write logical volume proxy component are similar to the read/write lock scrambling operation as describe above.

In the actual application, there may be a case where the read/write lock scrambling result of the target logical volume proxy component and the read/write regaining result of the historical read/write logical volume proxy component are both failure, the logical volume management component may mark the logical volume as failed to wait for subsequent maintenance, and performs the related operation again after the logical volume is restored to the normal state.

For the data read/write test, considering a possibility where a plurality of hosts simultaneously perform a read/write operation for test sectors, when performing a data read/write test, the logical volume management component can sequentially allocate a test sector location allowing writing of each host in each logical unit. For example, in an implementation of the present disclosure, assumed that a certain logical unit is provided with 128 test sectors, a host No. 1 can be allocated to perform the read/write test using test sectors No. 1 and No. 2 in the 128 test sectors, and a host No. 2 performs a read/write test using test sectors No. 3 and No. 4 in the 128 test sectors, and so on.

Figure 4:
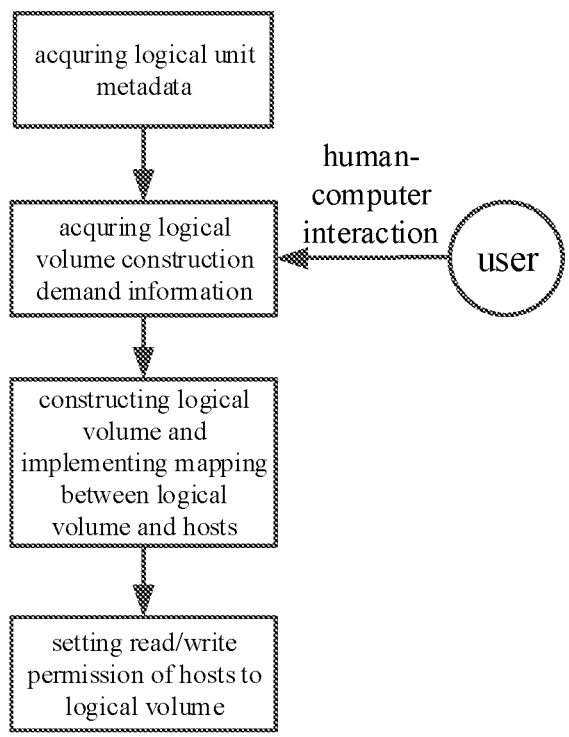
FIG. 4 illustrates a flowchart of an overall logical unit construction process according to an implementation of the present disclosure.

In a word, the overall logical volume construction flow according to an implementation of the present disclosure is shown in FIG. 4. In the implementation, logical unit metadata are first acquired; logical volume construction demand information is acquired from a user via human-computer interaction; a logical volume is constructed based on the logical unit metadata and the logical volume construction demand information; a mapping between the logical volume and all the participating hosts is implemented; and finally, the read/write permission of the hosts to the logical volume are set.

Based on the above technical solution, in absence of cooperation of an application layer such as a file system and the like, management and read/write control of a logical volume between a plurality of hosts can be achieved by means of settings of different hosts for the read/write permission for a logical volume, to thus meet the read/write control requirement of write once read many at the global level while reducing the complexity of implementing logical volume management, and a global read/write control solution in storage is provided for an application in a form of write once read many. Meanwhile, logical units from different physical storage devices can also achieve dynamic capacity expansion, breaking through the capacity limitation of a single logical unit or a single physical storage device, and the stripe combination of logical units can effectively improve the system IO throughput performance.

Figure 5:
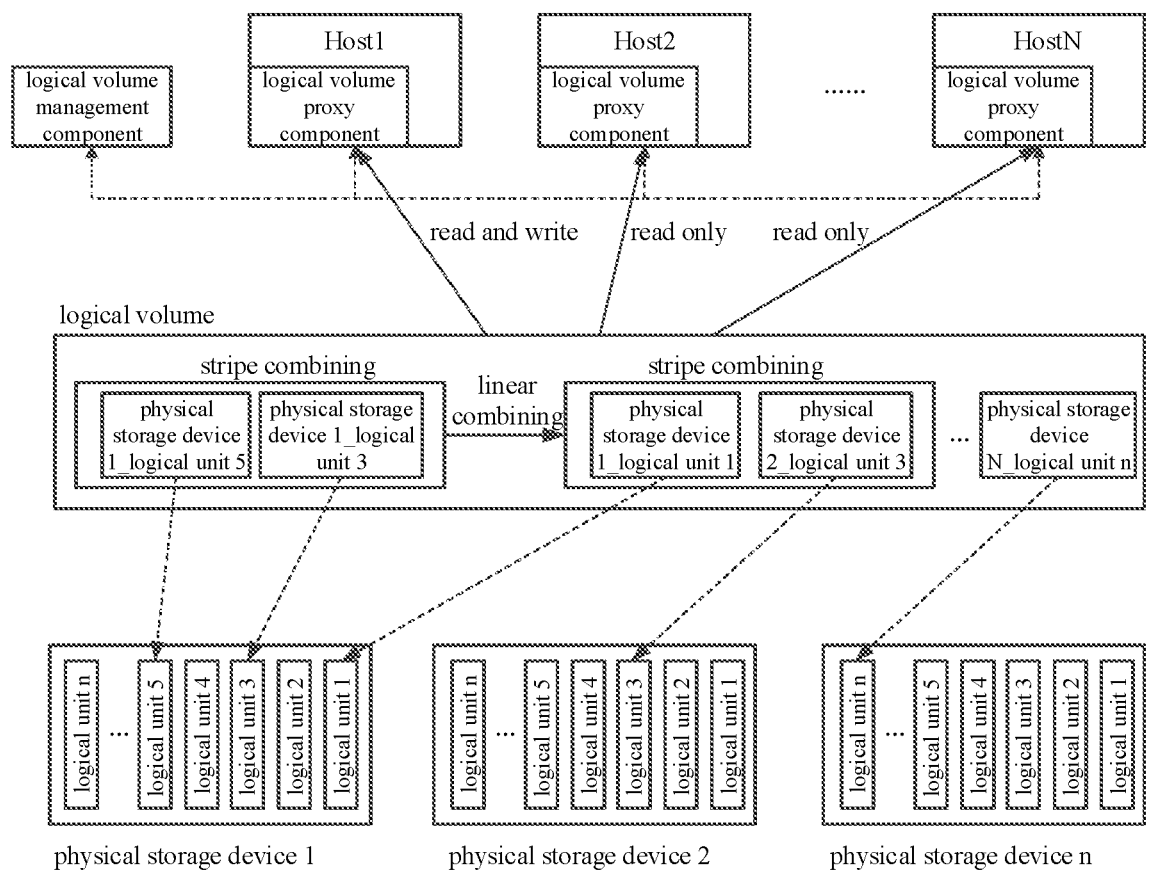
FIG. 5 illustrates a schematic diagram of a logical volume constructed according to an implementation of the present disclosure.

FIG. 5 illustrates a schematic diagram of a logical volume constructed according to an implementation of the present disclosure. In FIG. 5, the logical volume is formed by combining a plurality of logical units from different physical storage devices in a linear stripe manner, where a logical unit 5 from a physical storage device 1 and the logical unit 3 from the physical storage device are combined in a stripe manner, a logical unit 1 from the physical storage device 1 and a logical unit 3 from a physical storage device 2 are combined in a stripe manner, and so on, and the plurality of stripe combinations obtained finally are combined in a linear manner. Logical volume proxy components deployed over N hosts have a mapping relationship with the logical volume, where the first host has the read/write permission while other hosts have a read-only permission. The logical volume management component is deployed on a host in communication with a network comprised of N hosts, and in communication with logical volume proxy components on N hosts.

The technical solution provided by embodiments of the present disclosure may include the following advantages:

According to the technical solution, logical units from different or heterogeneous physical storage devices can be combined to construct a new logical volume, and the logical volume is mapped to all hosts required to perform data storage access (i.e., a connection with one or more hosts is established), such that subsequent access to physical storage devices by applications can be performed based on a new logical volume. In absence of cooperation of an application layer such as a file system and the like, the technical solution can achieve management and read/write control of a logical volume between a plurality of hosts by means of settings of different hosts for the read/write permission for a logical volume, to thus meet the read/write control requirement of write once read many at the global level while reducing the complexity of implementing logical volume management, and a global read/write control solution in storage is provided for an application in a form of write once read many.

Apparatus embodiments of the present disclosure described below can be used to implement the method embodiments of the present disclosure.

Figure 6:
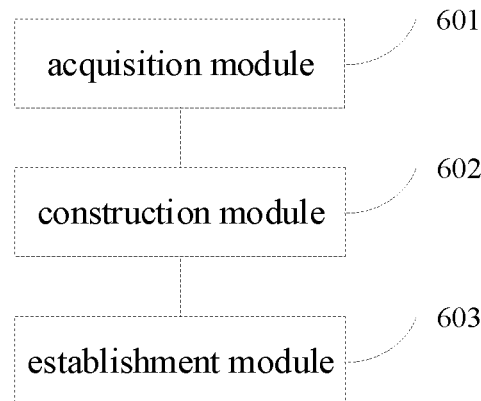
FIG. 6 illustrates a block diagram of a structure of a logical volume construction apparatus according to an implementation of the present disclosure.

FIG. 6 illustrates a block diagram of a structure of a logical volume construction apparatus according to an implementation of the present disclosure, where the apparatus can be implemented as a part or entirety of an electronic device by means of software, hardware or a combination thereof. As shown in FIG. 6, the logical volume construction apparatus includes: an acquisition module 601 configured to acquire logical volume construction demand information; a construction module 602 configured to construct a logical volume based on the logical volume construction demand information and obtain logical volume information, where the logical volume includes one or more logical units from different physical storage devices; and an establishment module 603 configured to establish a connection between one or more hosts and the logical volume based on the logical volume information, where the hosts have a mapping relation with the logical volume and differ in read/write permission for the logical volume.

As described above, with the development of data technology, shared storage has a much broader application. Shared storage refers to a type of storage products installed on a plurality of hosts or computing nodes and configured allow the hosts or computing nodes to simultaneously access data thereon. For example, SAN (Storage Area Network) storage and distributed storage are currently common shared storage products that can support write once read many, but the SAN storage and the distributed storage are limited, to different extent, in terms of capacity, read/write switch and the like. According to the related technologies, there are provided solutions including an LVM (Logical Volume Manager) and a CLVM (Cluster Logical Volume Manager). However, as a stand-alone version, LVM cannot implement read/write control of an LV (Logical Volume) between multiple hosts; though the CLVM is a cluster version, it requires an application such as a file system, and the like, to implement read/write control as lacking read/write control therein. That is, the solutions according to the related technologies can only partly provide the LV capability, but cannot meet the write once read many requirements at the global level.

Considering the above problem, in the implementation, there is provided a logical volume construction apparatus, which can construct a new logical volume by combining logical units from different or heterogeneous physical storage devices, and map the logical volume to all hosts required to perform data storage access (i.e., a connection with one or more hosts is established), such that subsequent access to physical storage devices by applications can be performed based on a new logical volume. In absence of cooperation of an application layer such as a file system and the like, the technical solution can achieve management and read/write control of a logical volume between a plurality of hosts by means of settings of different hosts for the read/write permission for a logical volume, to thus meet the read/write control requirement of write once read many at the global level while reducing the complexity of implementing logical volume management, and a global read/write control solution in storage is provided for an application in a form of write once read many.

In an implementation of the present disclosure, the logical volume construction apparatus can be implemented as a computer, an electronic device, a server, a server cluster, and the like, that can perform logical volume construction processing.

In an implementation of the present disclosure, the acquisition module is configured to: acquire logical volume construction demand information from an interaction interface of a terminal.

In an implementation of the present disclosure, the logical volume construction demand information includes one or more of the following: a logical volume name, a logical volume level demand information, logical unit information composing the logical volume, and a logical unit combining manner;

The logical volume information includes one or more of information: a logical volume name, logical volume level information, a logical volume size, logical unit information composing the logical volume, and a logical unit combining manner.

In an implementation of the present disclosure, a part in the construction module for constructing a logical volume based on the logical volume construction demand information is configured to: determine target logical units based on the logical volume level demand information and logical unit information composing the logical volume in the logical volume construction demand information; combining the target logical units based on the logical unit combining manner, to obtain a logical volume; and naming a logical volume based on the logical volume name.

In an implementation of the present disclosure, a construction module is configured for: sending, by a logical volume management component, logical volume information to logical volume proxy components, where the logical volume proxy components are deployed over different hosts; and establishing, by the logical volume management component, a connection between the hosts and the logical volume based on the logical volume information.

In an implementation of the present disclosure, a part for the establishing, by the logical volume proxy components, the connection between the hosts and the logical volume based on the logical volume information is configured for: performing a level check, by an executed logical volume proxy component, based on the logical volume information; upon determining the level check passes, storing, by the executed logical volume proxy component, the logical volume information, the logical unit information included in the logical volume, and logical unit mapping data into predetermined sectors of respective logical units of the logical volume; reading the logical volume information, the logical unit information comprised in the logical volume, and the logical unit mapping data from the predetermined sectors of the logical units, and performing a security check based on the logical unit information, by a non-executed logical volume proxy component; and upon determining that the security check passes, establishing, by the logical volume proxy components, the connection between the hosts and the logical volume based on the logical unit mapping data.

In an implementation, a part for establishing, by the logical volume proxy components, the connection between the hosts and the logical volume based on the logical unit mapping data upon determining the security check passes, is configured for: upon determining that the security check passes, sending, by the logical volume proxy components, a logical unit mapping data reading result to the logical volume management component; in a case that all the logical volume proxy components successfully read the logical unit mapping data, determining that mapping data reading succeeds, and sending, by the logical volume management component, a mapping data reading success message to the logical volume proxy components, and establishing, by the logical volume proxy components, the connection between the hosts and the logical volume based on the logical unit mapping data; and in a case that one of logical volume proxy component fails to read the logical unit mapping data, determining that mapping data reading fails, and sending, by the logical volume management component, a mapping data reading failure message to the logical volume proxy components, and deleting, by the logical volume management component, logical unit mapping data obtained by reading.

In an implementation of the present disclosure, the acquisition module is further configured to: acquire and store logical unit metadata, and send the logical unit metadata to the logical volume management component for storage, by the logical volume proxy components.

In an implementation of the present disclosure, the apparatus further includes: a control module configured to control read/write permission of one or more hosts based on a received read/write designation instruction.

In an implementation of the present disclosure, a part of controlling the read/write permission of one or more hosts based on the received read/write designation instruction is configured for: in response to the received read/write designation instruction, sending, by the logical volume management component, a read/write lock scrambling instruction to a target logical volume proxy component of a target host corresponding to the read/write designation instruction; in response to receiving the read/write lock scrambling instruction, performing, by the target logical volume proxy component, a read/write lock scrambling operation; in response to that the read/write lock scrambling operation succeeds, performing, by the target logical volume proxy component, a data read/write test for the logical units of the logical volume; sending, by the target logical volume proxy component, a read/write lock scrambling result and a data read/write test result to the logical volume management component; in a case that both the read/write lock scrambling result and the data read/write test result are success, sending, by the logical volume management component, a data read/write test command to other logical volume proxy components, to determine that the other logical volume proxy component succeeds in data reading but fails in data writing; in a case that the read/write lock scrambling result is failure, sending, by the logical volume management component, a read/write scrambling instruction to historical read/write logical volume proxy components, to enable the historical read/write logical volume proxy components to regain read/write permission; in a case that a read/write lock scrambling result of the target logical volume proxy component and a read/write regaining result of the historical read/write logical volume proxy components are both failure, cause the logical volume management component to mark the logical volume as failed.

The technical features and descriptions corresponding thereto involved in the apparatus embodiments are identical or similar to, or correspond to, those involved in the method embodiments. For the technical features and descriptions corresponding thereto involved in the apparatus embodiments, see those involved in the method embodiments, details of which are omitted here.

Figure 7:
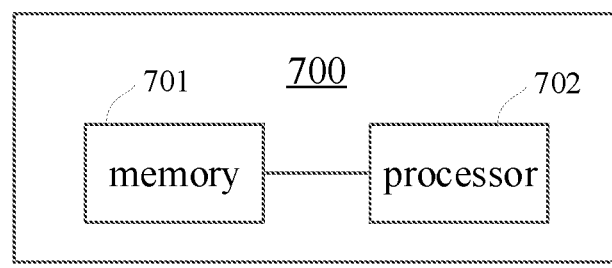
FIG. 7 illustrates a block diagram of a structure of an electronic device according to an implementation of the present disclosure.

In the present disclosure is further disclosed an electronic device. FIG. 7 illustrates a block diagram of an electronic device according to an implementation of the present disclosure. As shown therein, the electronic device 700 includes a memory 701 and a processor 702, where the memory 701 is used to store one or more computer instructions which are executed by the processor 702 to implement the method steps as described above.

Figure 8:
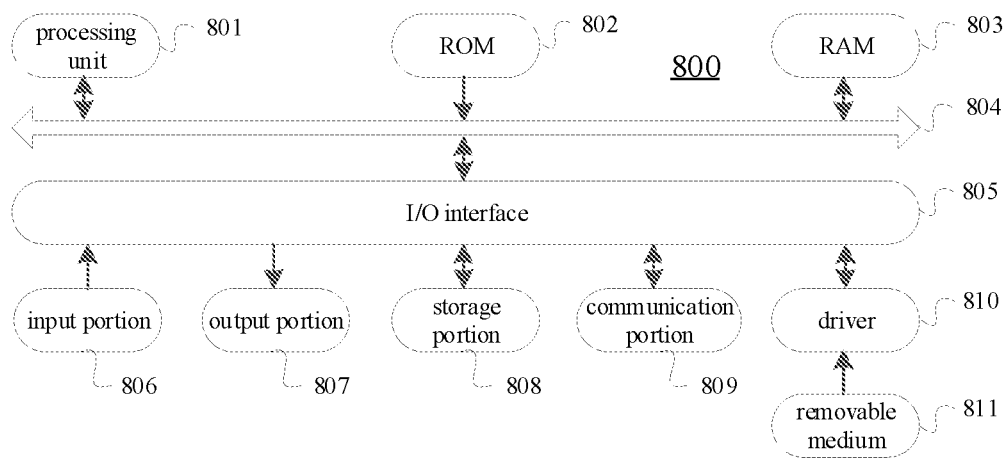
FIG. 8 is a schematic diagram of a structure of a computer system adapted to implement a logical volume construction method according to an implementation of the present disclosure.

FIG. 8 illustrates a schematic diagram of a structure of a computer system adapted to implement a logical volume construction method according to an implementation of the present disclosure.

As shown in FIG. 8, the computer system 800 includes a processing unit 801 which can execute processing according to the above implementations based on a program stored in a Read-Only Memory (ROM) 802 or a program loaded from a storage part 803 to a Random Access Memory (RAM) 803. In the RAM 803, there are further stored various types of programs and data required for operations of the system 800. The processing unit 801, the ROM 802 and the RAM 803 are connected to each other via a bus 804. An input/output (I/O) interface 805 is also connected to the bus 804.

The following are connected to the I/O interface 805: an input portion 806 including a keyboard, a mouse, and the like, an output portion 807 including, for example, a Cathode Ray Tube (CRT), a Liquid Crystal Display (LCD), a speaker, and the like; a communication portion 809 including, for example, a network interface card such as an LAN card, a modem, and the like. The communication portion 809 performs communication processing via a network such as the Internet. A driver 810 may be connected to the I/O interface 805 as required. A removable medium 811 such as a disk, an optical disk, a magneto-optical disk, a semiconductor memory, or the like, may be installed on the driver 810, to enable a computer program read therefrom to be installed in a storage portion 808 as required. Wherein, the processing unit 801 can be implemented as a CPU, a GPU, a TPU, an FPGA, an NPU, or the like.

In an embodiment, according to the implementations of the present disclosure, the method described above can be implemented as a computer software program. For example, according to the implementations of the present disclosure, there is provided a computer program product comprising a computer program tangibly included on a readable medium thereof, where the computer program includes program code for performing a route planning method. In those implementations, the computer program can be downloaded and installed by the communication portion 809 from the network, and/or installed from the removable medium.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units or modules as described in the embodiments of the present disclosure may be implemented in the form of software, or may be implemented in the form of hardware. A term for a unit or module as described here may be arranged in the processor, and names of those units or modules do not formulate limitations to the units or modules per se, in some circumstances.

In a further aspect, embodiments of the present disclosure further provide a computer readable storage medium which may be a computer readable storage medium included in the apparatus according to the above implementations, or may be a computer readable medium existing alone, not installed in the device. The computer readable storage medium stores therein one or more programs that are executed by one or more processors to perform the method according to embodiments of the present disclosure.

The above have been described only preferred embodiments of the present disclosure and the principles of applied techniques. It will be appreciated by those skilled in the art that, the scope of the claimed invention as disclosed above here are not limited to those formed by particular combinations of features described above, but should cover other solutions formed by any combination of features mentioned in the foregoing or an equivalent thereof without departing from the inventive concepts, for example, a solution formed by replacing one or more features as discussed above with one or more features with similar functions disclosed (but not limited to) in the present disclosure.

What is claimed is:

1. A logical volume construction method, comprising:
   acquiring logical volume construction demand information, wherein the logical volume construction demand information comprises logical volume level demand information, and logical unit information composing the logical volume;
   constructing a logical volume based on the logical volume construction demand information and obtaining logical volume information, wherein the logical volume comprises one or more logical units from different physical storage devices, and wherein the logical volume information comprises logical volume level information, and logical unit information comprising the logical volume, and a level of the logical volume is set according to physical storage devices that are sources of the logical units of the logical volume; and
   establishing, based on the logical volume information, a connection between one or more hosts and the logical volume, wherein the hosts have a mapping relationship with the logical volume and differ in read/write permission for the logical volume, wherein a connection between the hosts and the logical volume is established based on logical unit mapping data after both a level check and a security check are passed, wherein the level check is performed according to the logical volume level demand information and the logical volume level information, and the security check is performed according to the logical unit information of the logical volume.

2. The method of claim 1, wherein the acquiring the logical volume construction demand information, comprises:
acquiring the logical volume construction demand information from an interaction interface of a terminal.

3. The method of claim 1, wherein the logical volume construction demand information comprises one or more of the following: a logical volume name, and a logical unit combining manner; and
the logical volume information comprises one or more of the following: a logical volume name, a logical volume size, and a logical unit combining manner.

4. The method of claim 3, wherein the constructing the logical volume based on the logical volume construction demand information, comprises:
determining target logical units based on the logical volume level demand information and the logical unit information composing the logical volume in the logical volume construction demand information;
combining the target logical units based on the logical unit combining manner, to obtain the logical volume; and
naming the logical volume based on the logical volume name.

5. The method of claim 1, wherein the establishing, based on the logical volume information, the connection between the one or more hosts and the logical volume, comprises:
sending, by a logical volume management component, the logical volume information to logical volume proxy components, wherein the logical volume proxy components are deployed over different hosts; and
establishing, by the logical volume proxy components, the connection between the hosts and the logical volume based on the logical volume information.

6. The method of claim 5, wherein the establishing, by the logical volume proxy components, the connection between the hosts and the logical volume based on the logical volume information, comprises:
performing the level check, by an executed logical volume proxy component, based on the logical volume information;
upon determining that the level check passes, storing, by the executed logical volume proxy component, the logical volume information, the logical unit information comprised in the logical volume, and logical unit mapping data into predetermined sectors of respective logical units of the logical volume;
reading the logical volume information, the logical unit information comprised in the logical volume, and the logical unit mapping data from the predetermined sectors of the logical units and performing the security check based on the logical unit information, by a non-executed logical volume proxy component; and
upon determining that the security check passes, establishing, by the logical volume proxy components, the connection between the hosts and the logical volume based on the logical unit mapping data.

7. The method of claim 6, wherein upon determining that the security check passes, establishing, by the logical volume proxy components, the connection between the hosts and the logical volume based on the logical unit mapping data, comprises:
upon determining that the security check passes, sending, by the logical volume proxy components, a logical unit mapping data reading result to the logical volume management component;
in a case that all the logical volume proxy components successfully read the logical unit mapping data, determining that mapping data reading succeeds, sending, by the logical volume management component, a mapping data reading success message to the logical volume proxy components, and establishing, by the logical volume proxy components, the connection between the hosts and the logical volume based on the logical unit mapping data; and
in a case that one of the logical volume proxy components fails to read the logical unit mapping data, determining that mapping data reading fails, sending, by the logical volume management component, a mapping data reading failure message to the logical volume proxy components, and deleting, by the logical volume proxy components, the logical unit mapping data obtained by reading.

8. The method of claim 1, further comprising:
acquiring and storing logical unit metadata and sending the logical unit metadata to the logical volume management component for storage, by the logical volume proxy components.

9. The method of claim 1, further comprising:
controlling, based on a received read/write designation instruction, the read/write permission of the one or more hosts.

10. The method of claim 9, wherein the controlling, based on the received read/write designation instruction, the read/write permission of the one or more hosts, comprises:
in response to receiving the read/write designation instruction, sending, by the logical volume management component, a read/write lock scrambling instruction to a target logical volume proxy component of a target host corresponding to the read/write designation instruction;
in response to receiving the read/write lock scrambling instruction, performing, by the target logical volume proxy component, a read/write lock scrambling operation;
in response to that the read/write lock scrambling operation succeeds, performing, by the target logical volume proxy component, a data read/write test for the logical units of the logical volume;
sending, by the target logical volume proxy component, a read/write lock scrambling result and a data read/write test result to the logical volume management component;
in a case that both the read/write lock scrambling result and the data read/write test result are success, sending, by the logical volume management component, a data read/write test command to other logical volume proxy component, to determine whether the other logical volume proxy component succeeds in data reading but fails in data writing;
in a case that the read/write lock scrambling result is failure, sending, by the logical volume management component, a read/write scrambling instruction to a historical read/write logical volume proxy component, to enable the historical read/write logical volume proxy component to regain the read/write permission; and
in a case that a read/write lock scrambling result of the target logical volume proxy component and a read/write regaining result of the historical read/write logical volume proxy component are both failure, marking, by the logical volume management component, the logical volume as failed.

11. An electronic device, comprising a memory and a processor, wherein:
the memory is used to store one or more computer instructions that are executed by the processor to implement steps of the method of claim 1.

12. A non-transitory computer readable storage medium having computer instructions stored thereon, wherein the computer instructions are executed by a processor to implement steps of the method of claim 1.

13. A computer program product, comprising computer programs/instructions stored in a non-transitory computer readable storage medium, wherein the computer programs/instructions are executed by a processor to implement steps of the method of claim 1.

14. The method of claim 2, wherein the logical volume construction demand information comprises one or more of the following: a logical volume name, and a logical unit combining manner; and
the logical volume information comprises one or more of the following: a logical volume name, a logical volume size, and a logical unit combining manner.

15. A computer program product, comprising computer programs/instructions stored in a non-transitory computer readable storage medium, wherein the computer programs/instructions are executed by a processor to implement steps of the method of claim 2.

16. A computer program product, comprising computer programs/instructions stored in a non-transitory computer readable storage medium, wherein the computer programs/instructions are executed by a processor to implement steps of the method of claim 3.

17. A computer program product, comprising computer programs/instructions stored in a non-transitory computer readable storage medium, wherein the computer programs/instructions are executed by a processor to implement steps of the method of claim 4.

18. A computer program product, comprising computer programs/instructions stored in a non-transitory computer readable storage medium, wherein the computer programs/instructions are executed by a processor to implement steps of the method of claim 5.

19. A computer program product, comprising computer programs/instructions stored in a non-transitory computer readable storage medium, wherein the computer programs/instructions are executed by a processor to implement steps of the method of claim 6.

* * * * *